US006398911B1

(12) United States Patent
Schroeder et al.

(10) Patent No.: US 6,398,911 B1
(45) Date of Patent: Jun. 4, 2002

(54) MODIFIED POLYSACCHARIDES CONTAINING POLYSILOXANE MOIETIES

(75) Inventors: Wen Zyo Schroeder, Neenah; Daniel Arthur Clarahan, Greenleaf; Mike Thomas Goulet, Neenah; Thomas Gerard Shannon, Appleton, all of WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/489,359

(22) Filed: Jan. 21, 2000

(51) Int. Cl.⁷ .......................... D21H 21/00; D21H 17/24
(52) U.S. Cl. .................... 162/164.4; 162/175; 162/177; 162/178
(58) Field of Search ............................. 162/175, 164.4, 162/158, 177, 178

(56) References Cited

U.S. PATENT DOCUMENTS

| | | |
|---|---|---|
| 2,661,349 A | 12/1953 | Caldwell et al. |
| 2,876,217 A | 3/1959 | Paschall |
| 2,926,116 A | 2/1960 | Keim |
| 2,926,154 A | 2/1960 | Keim |
| 2,995,513 A | 8/1961 | Paschall et al. |
| 3,128,311 A | 4/1964 | Shirley et al. |
| 3,152,998 A | 10/1964 | Moss |
| 3,155,728 A | 11/1964 | Lesesne |
| 3,236,792 A | 2/1966 | Curtis |
| 3,236,895 A | 2/1966 | Lee et al. |
| 3,240,721 A | 3/1966 | Fordyce |
| 3,250,664 A | 5/1966 | Conte et al. |
| 3,347,926 A | 10/1967 | Zech |
| 3,434,984 A | 3/1969 | Hyland, Jr. |
| 3,436,359 A | 4/1969 | Hubin et al. |
| 3,438,970 A | 4/1969 | Chamberlain et al. |
| 3,449,886 A | 6/1969 | Connelly et al. |
| 3,511,830 A | 5/1970 | Speakman |
| 3,513,156 A | 5/1970 | Speakman |
| 3,609,126 A | 9/1971 | Asao et al. |
| 3,620,913 A | 11/1971 | Parmerter |
| 3,649,624 A | 3/1972 | Powers et al. |
| 3,654,370 A | 4/1972 | Yeakey |
| 3,770,472 A | 11/1973 | Jarowenko |
| 3,793,279 A | 2/1974 | Lipowski |
| 3,893,885 A | 7/1975 | Ziemann et al. |
| 3,940,519 A | 2/1976 | Helmer et al. |
| 4,014,933 A | 3/1977 | Boettger et al. |
| 4,066,495 A | 1/1978 | Voigt et al. |
| 4,153,581 A | 5/1979 | Habermann |
| RE30,193 E | 1/1980 | O'Shaughnessy |
| 4,267,059 A | 5/1981 | Behn et al. |
| 4,278,573 A | 7/1981 | Tessler |
| 4,447,498 A | 5/1984 | Fink et al. |
| 4,450,045 A | 5/1984 | Hertel et al. |
| 4,521,490 A | 6/1985 | Pocius et al. |
| 4,741,804 A | 5/1988 | Solarek et al. |
| 4,764,418 A | 8/1988 | Kuenn et al. |
| 4,766,245 A | 8/1988 | Larkin et al. |
| 4,801,699 A | 1/1989 | Jobe et al. |
| 4,824,689 A | 4/1989 | Kuenn et al. |
| 4,866,151 A | 9/1989 | Tsai et al. |
| 4,959,125 A | 9/1990 | Spendel |
| 4,973,680 A | * 11/1990 | Billmers ..................... 162/175 |
| 4,983,748 A | 1/1991 | Tsai et al. |

(List continued on next page.)

FOREIGN PATENT DOCUMENTS

| | | |
|---|---|---|
| DE | 2 247 943 | 4/1973 |
| EP | 0 620 315 A1 | 10/1994 |
| EP | 0 761 691 A2 | 3/1997 |
| WO | WO 99/12977 A1 | 3/1999 |

OTHER PUBLICATIONS

Derwent World Patent Database abstract of SU 451,731: Description of Vladimir Synth Resi, "Cyanoethylated Starch Adhesive for Electroluminescent Lamps."
Burr, R.C., et al., "Starch Graft Copolymers for Water Treatment," *Die Starke*, 27, Nr. 5, 1975, pp. 155–159.
Cheng, W.C. et al., "O–Carboxymethylstarch Amine Polyampholytes as Papermaking Additives," *Starch/Staärke*, vol. 30, No. 8, Aug. 1978, pp. 280–282.
Farewell, John, Editor, *Commerically Available Chemical Agents for Paper and Paperboard Manufacture*, Fourth Edition, Tappi Press, 1990, pp. 5–6.
Hamerstrand, G.E., et al., "An Evaluation of Cationic Aminoethyl Cereal Flours as Wet–End Paper Additives," *Tappi*, vol. 58, No. 1, Jan. 1975, pp. 112–115.
Heath, H.D., et al., "Flocculating Agent–Starch Blends for Interfiber Bonding and Filler Retention: Comparative Performance With Cationic Starches," *Tappi*, vol. 57, No. 11, Nov. 1974, pp. 109–111.
Lindsay, William F., "Absorbent Starch Based Co–polymers—Their Characteristics and Applications," *Formed Fabrics Industry*, 8(5), 1977, pp. 20, 24, 26.
Van Beynum, G.M.A., editor, *Starch Conversion Technology*, Marcel Dekker, Inc., New York, 1985, pp. 92–93.

*Primary Examiner*—Peter Chin
*Assistant Examiner*—Carlos Lopez
(74) *Attorney, Agent, or Firm*—Gregory E. Croft (57) ABSTRACT

Modified polysaccharides (such as starches, gums, chitosans, celluloses, alginates, sugars, etc.), which are commonly used in the paper industry as strengthening agents, surface sizes, coating binders, emulsifiers and adhesives, can be combined into a single molecule with modified aliphatic hydrocarbons, which are commonly utilized, in conjunction with cationic moieties, as softeners, debonders, lubricants and sizing agents. The resulting molecule is a modified polysaccharide having an aliphatic moiety which can provide several potential benefits, depending on the specific combination employed, including: (a) strength aids that do not impart stiffness; (b) softeners that do not reduce strength; (c) wet strength with improved wet/dry strength ratio; (d) debonders with reduced linting and sloughing; (e) strength aids with controlled absorbency; and (f) surface sizing agents with improved tactile properties.

6 Claims, No Drawings

U.S. PATENT DOCUMENTS

| | | |
|---|---|---|
| 5,174,927 A | 12/1992 | Honsa |
| 5,518,585 A | 5/1996 | Huth et al. |
| 5,525,345 A | 6/1996 | Warner et al. |
| 5,552,020 A * | 9/1996 | Smith et al. ............ 162/164.4 |
| 5,575,891 A | 11/1996 | Trokhan et al. |
| 5,578,678 A | 11/1996 | Hartmann et al. |
| 5,591,306 A | 1/1997 | Kaun |
| 5,612,443 A | 3/1997 | Martino et al. |
| 5,624,532 A | 4/1997 | Trokhan et al. |
| 5,626,719 A | 5/1997 | Tansley et al. |
| 5,656,746 A | 8/1997 | Smith et al. |
| 5,354,425 A | 10/1997 | Mackey et al. |
| 5,716,692 A | 2/1998 | Warner et al. |
| 5,746,887 A | 5/1998 | Wendt et al. |
| 5,770,711 A | 6/1998 | Greene et al. |
| 5,772,845 A | 6/1998 | Farrington, Jr. et al. |
| 5,785,813 A | 7/1998 | Smith et al. |
| 5,856,299 A | 1/1999 | Righetto et al. |
| 5,958,187 A | 9/1999 | Bhat et al. |
| 6,059,928 A | 5/2000 | Van Luu et al. |
| 6,090,242 A | 7/2000 | Drummond et al. |
| 6,126,784 A | 10/2000 | Ficke et al. |
| 6,153,053 A | 11/2000 | Harper et al. |
| 6,190,678 B1 | 2/2001 | Hasenoehrl et al. |
| 6,193,843 B1 | 2/2001 | Tsai et al. |
| 6,204,254 B1 | 3/2001 | Nelson et al. |
| 6,207,012 B1 | 3/2001 | Oriaran et al. |
| 6,207,013 B1 | 3/2001 | Oriaran et al. |
| 6,235,155 B1 | 5/2001 | Schroeder et al. |

* cited by examiner

MODIFIED POLYSACCHARIDES CONTAINING POLYSILOXANE MOIETIES

BACKGROUND OF THE INVENTION

In the manufacture of paper products, such as facial tissue, bath tissue, paper towels, dinner napkins and the like, a wide variety of product properties are imparted to the final product through the use of chemical additives. Examples of such additives include softeners, debonders, wet strength agents, dry strength agents, sizing agents, opacifiers and the like. In many instances, more than one chemical additive is added to the product at some point in the manufacturing process. Unfortunately, there are instances where certain chemical additives may not be compatible with each other or may be detrimental to the efficiency of the papermaking process, such as can be the case with the effect of wet end chemicals on the downstream efficiency of creping adhesives. Another limitation, which is associated with wet end chemical addition, is the limited availability of adequate bonding sites on the papermaking fibers to which the chemicals can attach themselves. Under such circumstances, more than one chemical functionality compete for the limited available bonding sites, oftentimes resulting in the insufficient retention of one or both chemicals on the fibers.

Therefore, there is a need for a means of applying more than one chemical functionality to a paper web which mitigates the limitations created by limited number of bonding sites.

SUMMARY OF THE INVENTION

In certain instances, two or more chemical functionalities can be combined into a single molecule, such that the combined molecule imparts at least two distinct product properties to the final paper product that heretofore have been imparted through the use of two or more different molecules. More specifically, modified polysaccharides (such as starches, gums, chitosans, celluloses, alginates, sugars, etc.), which are commonly used in the paper industry as strengthening agents, surface sizes, coating binders, emulsifiers and adhesives, can be combined into a single molecule with modified aliphatic hydrocarbons, which are commonly utilized, in conjunction with cationic moieties, as softeners, debonders, lubricants and sizing agents. The resulting molecule is a modified polysaccharide having an aliphatic moiety which can provide several potential benefits, depending on the specific combination employed, including: (a) strength aids that do not impart stiffness; (b) softeners that do not reduce strength; (c) wet strength with improved wet/dry strength ratio; (d) debonders with reduced linting and sloughing; (e) strength aids with controlled absorbency; and (f) surface sizing agents with improved tactile properties.

Hence in one aspect, the invention resides in a modified polysaccharide containing one or more aliphatic hydrocarbon moieties, said modified polysaccharide having the following structure:

where
Polysac=any polysaccharide, monosaccharide, or sugar residue, modified or unmodified.
$R_1$=Organofunctional unit containing a polysiloxane moiety, substituted or non-substituted, linear or branched.
$Z_3$=a bridging radical whose purpose is to attach the $R_1$ functional moiety to the Polysac residue. Suitable bridging radicals would include but are not limited to —OOC—, —COO—, —NHCO—, —OCNH—, —O—, —S—, CONHCO, —NCOO, —OSO$_2$O—, OCOO, —OOC—Ar—O—.

In another aspect, the invention resides in a paper sheet, such as a tissue sheet, comprising a modified polysaccharide containing one or more polysiloxane moieties, said modified polysaccharide having the following structure:

where
Polysac=any polysaccharide, monosaccharide, or sugar residue, modified or unmodified.
$R_1$=Organofunctional unit containing a polysiloxane moiety, substituted or non-substituted, linear or branched.
$Z_3$=a bridging radical whose purpose is to attach the R1 functional moiety to the Polysac residue. Suitable bridging radicals would include but are not limited to —OOC—, —COO—, —NHCO—, —OCNH—, —O—, —S—, CONHCO, —NCOO, —OSO2O—, OCOO, —OOC—Ar—O—.

In another aspect, the invention resides in a method of making a paper sheet, such as a tissue sheet, comprising the steps of: (a) forming an aqueous suspension of papermaking fibers; (b) depositing the aqueous suspension of papermaking fibers onto a forming fabric to form a web; and (c) dewatering and drying the web to form a paper sheet, wherein a modified polysaccharide is added to the aqueous suspension, said modified polysaccharide having the following structure:

where
Polysac=any polysaccharide, monosaccharide, or sugar residue, modified or unmodified.
$R_1$=Organofunctional unit containing a polysiloxane moiety, substituted or non-substituted, linear or branched.
$Z_3$=a bridging radical whose purpose is to attach the R1 functional moiety to the Polysac residue. Suitable bridging radicals would include but are not limited to —OOC—, —COO—, —NHCO—, —OCNH—, —O—, —S—, CONHCO, —NCOO, —OSO$_2$O—, OCOO, —OOC—Ar—O—.

The amount of the modified polysaccharide added to the fibers can be from about 0.02 to about 2 weight percent, on a dry fiber basis, more specifically from about 0.05 to about 1 weight percent, and still more specifically from about 0.1 to about 0.75 weight percent. The modified polysaccharide can be added to the fibers at any point in the papermaking process. A preferred addition point is where the fibers are suspended in water. However, modified polysaccharides can also be added topically to a dried paper web.

As used herein, polysaccharides are carbohydrates that can be hydrolyzed to many monosaccharides and include, but are not limited to, starches (primarily modified starches from potato, corn, waxy maize, tapioca and wheat) which can be unmodified, acid modified, enzyme modified, cationic, anionic or amphoteric; carboxymethylcellulose, modified or unmodified; natural gums, modified or unmodified (such as from locust bean and guar); sugars, modified or unmodified; chitosan, modified or unmodified; and dextrins, modified and unmodified.

"Monosaccharide" is a carbohydrate that cannot be hydrolyzed into simpler compounds.

"Carbohydrates" are polyhydroxy aldehydes, polyhydroxy ketones or compounds that can be hydrolyzed to them.

have very little affinity for fibers, and modifications are widely done to extend the number of wet end starch additives available for use. Modifications to starches generally fall under one of the following categories: 1) Physical modifications, 2) Fractionation into amylose and amylopectin components, 3) Thermomechanical conversion, 4) Acid hydrolysis, 5) Chemical modifications, 6) Oxidation, 7) Derivatization and 8) Enzyme conversion.

FIG. 1

Starch-Amylose

Starch-Amylopectin

As used herein, polysiloxanes are macromolecules consisting of a polymer backbone of alternating silicon and oxygen atoms (—Si—O—) with a broad variety of organic side chains attached to the silicon atom. These side chains include in general alkyl and aliphatic hydrocarbons that can be linear or branched, saturated or unsaturated, substituted or non-substituted.

Methods of making paper products which can benefit from the various aspects of this invention are well known to those skilled in the papermaking art. Exemplary patents include U.S. Pat. No. 5,785,813 issued Jul. 28, 1998 to Smith et al. entitled "Method of Treating a Papermaking Furnish For Making Soft Tissue"; U.S. Pat. No. 5,772,845 issued Jun. 30, 1998 to Farrington, Jr. et al. entitled "Soft Tissue"; U.S. Pat. No. 5,746,887 issued May 5, 1998 to Wendt et al. entitled "Method of Making Soft Tissue Products"; and U.S. Pat. No. 5,591,306 issued Jan. 7, 1997 to Kaun entitled "Method For Making Soft Tissue Using Cationic Silicones", all of which are hereby incorporated by reference.

DETAILED DESCRIPTION OF THE INVENTION

To further describe the invention, examples of the synthesis of some of the various chemical species are given below.

Polysaccharides
Starches

Figure 1:
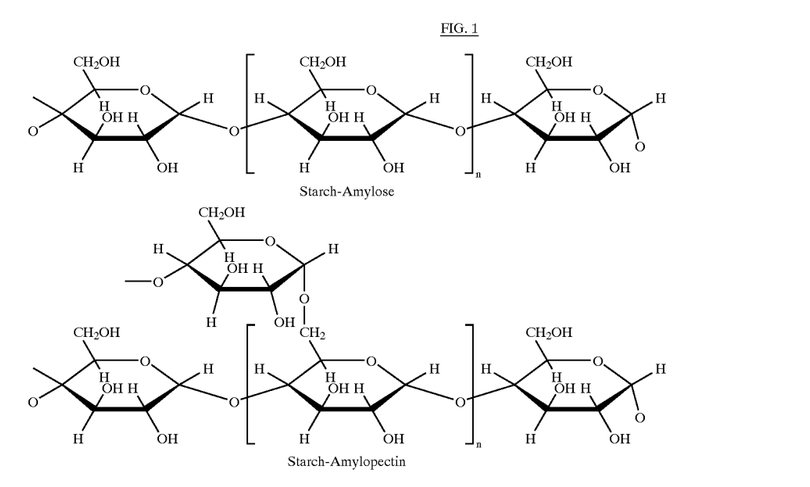

Unmodified starch has the structure shown in FIG. 1. Unmodified starches can differ in properties such as amylopectin: amylose ratio, granule dimension, gelatinization temperature, and molecular weight. Unmodified starches Starch derivatives are the most common type of dry strength additive used in the paper industry. The 1990 edition of the TAPPI publication "Commercially Available Chemical Agents for Paper and Paperboard Manufacture" lists 27 different starch dry strength products. Starch chemistry primarily centers on reactions with the hydroxyl groups and the glucosidic (C—O—C) linkages. Hydroxyl groups being subject to standard substitution reactions and the glucosidic linkages being subject to cleavage. In theory the primary alcohol at the C-6 position should be more reactive than the secondary alcohols at the C-2 and C-3 positions. Also, it has been found that the tuber starches are more reactive than the cereal starches.

A large variety of starch esters and ethers have been described. Few have been actively marketed due to non-specific properties resulting from the substitution groups. Esters will generally be prepared via reaction of the acid chloride or anhydride with the starch. Hydrophobic type structures can be introduced with this functionalization and such structures have found applications in the paper industry as adhesives, and grease resistant paper size coatings. (Starch Conversion Technology, 1985)

Cationic starches are recognized as the choice for wet end additives due to their substantivity with cellulose fibers. The cationization of starches is accomplished by reaction with various tertiary and quaternary amine reagents. In general, a reactive chloride or epoxy group on one end of the reagent reacts with a starch hydroxyl group. The cationic portion of the amine then ionizes in the presence of water to form the positively charged derivative which is substantive to fiber. Quaternary ammonium derivatives are most commonly used in the paper industry.

Other ionic charged starches are produced by reaction of starch with amino, imino, ammonium, sulfonium, or phosphonium groups, all of which carry an ionic charge. The key factor in their usefulness is their affinity for negatively charged substrates such as cellulose. These cationic starches have found widespread use in the paper industry as wet end additives, surface sizing agents and coating binders. Cationic starches improve sheet strength by promoting;ionic bonding and additional hydrogen bonding within the cellulose fibers. Some common reagents used to prepare cationic starches include: 2-diethylaminoethyl chloride (DEC); 2-dimethylaminoethyl chloride; 2-diisopropylaminoethyl chloride; 2-diethylaminoethyl bromide; 2-dimethylaminoisopropyl chloride; N-alkyl-N-(2-haloethyl)-aminomethylphosphonic acids; and 2,3-epoxypropyltrimethylammonium chloride.

Epichlorohydrin reacts with tertiary amines or their salts in water or nonaqueous solvents to form the quaternary ammonium reagents. Trimethylamine, dimethylbenzyl amine, triethylamine, N-ethyl and N-methyl morpholine, dimethylcyclohexylamine, and dimethyldodecylamine (Paschall, E.F., U.S. Pat. No. 2,876,217, 1959 and U.S. Pat. No. 2,995,513, 1961)have been used.

Cyanamide and dialkyl cyanamides can be used to attach imino carbamate groups on starches. These groups show cationic activity upon treatment with acids. The acidified products are stable to hydrolysis. Cationic cyanamide starches show useful properties as textile sizes and dry strength additives in paper. (Chamberlain, R. J., U.S. Pat. No. 3,438,970,1969).

Aminoethylated starches are produced by treatment of ethyleneimine with starch in organic solvents or dry. Acidified products are useful as wet end paper additives (Hamerstrand, et al, "An evaluation of cationic aminoethyl cereal flours as wet end paper additives" Tappi, 58, 112, 1975). Starches react with isatoic anhydride and its derivatives to form anthranilate esters with primary or secondary amino groups (U.S. Pat. Nos. 3,449,886; 3,511,830; 3,513,156; 3,620,913). Products with primary amino anthranilate groups can be derivatized and used to improve wet rub resistance in paper coatings.

Cationic starches containing anionic xanthate groups provided both wet strength and dry strength to paper when used as wet end additives in unbleached kraft pulp systems. (Powers, et al, U.S. Pat. No. 3,649,624, 1972). In this system it is believed that the permanent wet strength results from covalent bonding from the xanthate side chain reactions. (Cheng, W. C., et al, Die Starke, 30, 280, 1978)

Cationic dialdehyde starches are useful wet end additives for providing temporary wet strength to paper. They are produced by periodic acid oxidation of tertiary amino or quaternary ammonium starches, by treating dialdehyde starch with hydrazine or hydrazide compounds containing tertiary amino or quaternary ammonium groups, and several other reactions.

Graft copolymers of starch are widely known. Some graft copolymers made with starches include: vinyl alcohol; vinyl acetate; methyl methacrylate; acrylonitrile; styrene; acrylamide; acrylic acid; methacrylic acid; and cationic monomers with amino substituents including:2-hydroxy-3-methacryloporpyltrimethylammonium chloride (HMAC); N,N-dimethylaminoethyl methacrylate, nitric acid salt (DMAEMA*$HNO_3$); N-t-butylaminoethyl methacrylate, nitric acid salt (TBAEMA*$HNO_3$); and N,N,N-trimethylaminoethyl methacrylate methyl sulfate (TMAEMA*MS).

Polyacrylonitrile (PAN)/starch graft copolymers are well known in the art. Treatment of the PAN/starch graft copolymers with NaOH or KOH converts the nitrile substituents to a mixture of carboxamide and alkali metal carboxylate. Such hydrolyzed starch-g-PAN polymers (HSPAN) are used as thickening agents and as water absorbents. Important applications for HSPAN include use in disposable soft goods designed to absorb bodily fluids. (Lindsay, W. F., Absorbent Starch Based Copolymers—Their Characteristics and Applications, Formed Fabrics Industry, 8(5), 20, 1977).

Copolymers with water soluble grafts are also well known. Many of the water soluble graft copolymers are used for flocculation and flotation of suspended solids in the paper, mining, oil drilling and other industries. (Burr, R. C., et al, "Starch Graft Copolymers for Water Treatment", Die Starke, 27, 155, 1975. Graft copolymers from the cationic amine containing monomers are effective retention aids in the manufacture of filled papers. Starch-g-poly(acrylamide-co-TMAEMA*MS) was found to improve drainage rates while increasing dry tensile strength of unfilled paper handsheets. (Heath, H. D., et al, "Flocculating agent-starch blends for interfiber bonding and filler retention, comparative performance with cationic starches", TAPPI, 57(11), 109, 1974.)

Thermoplastic-g-starch materials are also known, primarily with acrylate esters, methacrylate esters and styrene. Primary interest for these materials is in preparation of biodegradable plastics. No use of these materials as a paper additive has been found.

Other miscellaneous graft copolymers are known. Saponified starch-g-poly(vinyl acetate) has been patented as a sizing agent for cotton, rayon and polyester yarns. (Prokofeva, et al, Russian patent 451731, 1975). Graft copolymers have been saponified to convert starch-g-poly (vinyl acetate) copolymers into starch-g-poly(vinyl acetate) copolymers. As with the thermoplastic-g-starch copolymers most of these materials have been evaluated as polymeric materials in their own right and not as additives for paper.

Carboxymethyl cellulose, methyl cellulose, alginate, and animal glues are superior film formers. These materials are typically applied via surface application and not added in the wet end of the process to improve dry strength. The products are relatively expensive and although they can be used alone they are typically employed in conjunction with starches or other materials.

Gums:

Gums and mucilages have been use in papermaking dates back to ancient China. These mucilages were obtained from various plant roots and stems and were used primarily as deflocculating and suspending agents for the long fibered pulps. As papermaking evolved other advantages of using these materials became obvious including the ability of these materials to hold the wet fiber mat together during the drying process. As papermaking evolved to using shorter and shorter fibers these gums found increased use as a means of obtaining paper strength. Since World War II the use of gums in papermaking has increased substantially.

Water soluble, polysaccharide gums are highly hydrophilic polymers having chemical structures similar to cellulose. The main chain consists of b1,4 linked mannose sugar units with occurrence of a-1,6 linked galactose side chains. Their similarity to cellulose means they are capable of extensive hydrogen bonding with fiber surfaces. Further enhancement of dry strength occurs due to the linear nature of the molecules.

Water soluble, polysaccharide gums are vegetable gums and include as examples 1) locust bean gum, 2) guar gum, 3) tamarind gum, and 4) karaya, okra and others. Locust bean gum and guar gum are the most commonly used. They have been used in the paper industry since just prior to WWII. Since the natural materials are non-ionic they are not retained on fibers to any great extent. All successful commercial products have cationic groups attached to the main chain which increases the retention of the gums on the fiber surfaces. Typical addition rates for these materials are on the order of 0.1–0.35%.

The dry strength improvement of paper furnishes through use of polysaccharide gums is derived from the linear nature of the polymer and through hydrogen bonding of the hydroxyl hydrogen of the polymer with similar functional groups on the surface of the cellulosic fibers.

system by forming more cohesive flocs. These in turn are trapped by longer fibers filling the voids among the larger fibers with additional material that helps in the inter fiber bonding of the wet web, which in turn leads to dry strength improvement.

Figure 3:
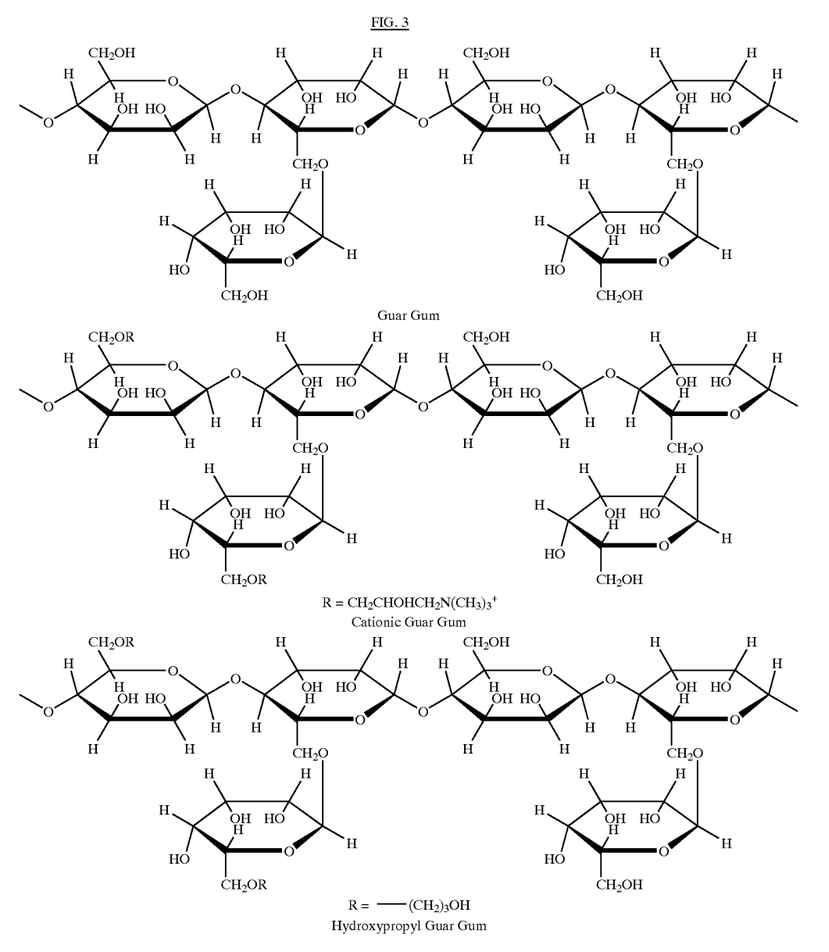

Although a variety of guar gum derivatives have been prepared, there are only three derivatizations which have achieved commercial significance. These are 1) Quaternization, 2) Carboxymethylation and 3) Hydroxypropylation. FIG. 3 shows the structure of guar gum and derivatives.

FIG. 3

Guar Gum $R = CH_2CHOHCH_2N(CH_3)_3^+$
Cationic Guar Gum $R = \text{———}(CH_2)_3OH$
Hydroxypropyl Guar Gum

The most effective gums are quaternary ammonium chloride derivatives containing a cationic charge. The cationic functionality will help the gum retain better to the fibers as well as reducing the usually higher negative zeta potential of the paper furnish, especially when fillers and fines are present in the white water. This change in zeta potential leads to a more thorough agglomeration of the fines in the

Chitosan:

Chitosan is a high molecular weight linear carbohydrate composed of β1,4-linked 2-amino-2-deoxy-D-glucose units. It is prepared from the hydrolysis of the N-acetyl derivative called chitin. Chitin is isolated in commercial quantities from the shells of crustaceans. Chitin is insoluble in most common solvents, however, chitosan is soluble in acidified water due to the presence of basic amino groups. Depending on the source and degree of deacetylation chitosans can vary in molecular weight and in free amine content. In sufficiently acidic environments the amino groups become protonated and chitosan behaves as a cationic polyelectrolyte. It has been reported that chitosans increase the dry strength of paper more effectively than other common papermaking additives including the polyethylenimines and polyacrylamides.

Figure 4:
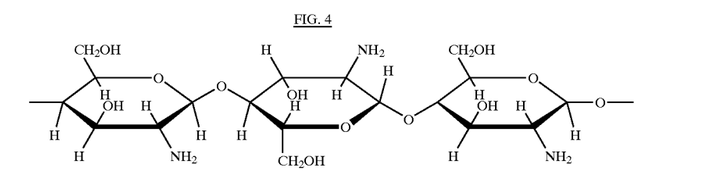

Chitosan and starch are both polymers of D-glucose but differ in two aspects. First, chitosan has an amino group on each glucose unit and therefore has a stronger cationic character than cationic starch. Secondly, starch differs in its molecular configuration. Starch contains amylopectin which has a three dimensional molecular structure and amylose, which has linear macromolecules. The glucose molecules of starch have an α-configuration which gives the molecules a helical form. Chitosan resembles cellulose and xylans in that it has βlinked D-monosaccharide units and tends to have straight molecular chains. The functionally reactive groups of a straight polymer molecule are more easily accessible than those of a branched, random configuration molecule and are expected to interact more effectively with the polar groups on cellulose. FIG. 4 shows the structure of chitosan.

FIG. 4

Sugars

Figure 5:
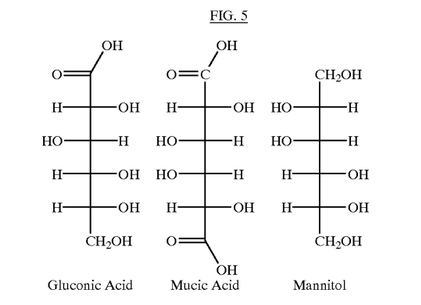
Figure 6:
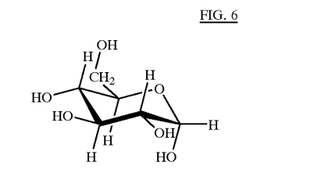

Also included in the saccharides are the simple sugars. These include the hexoses shown in FIG. 5. These compounds actually exist in the cyclic acetal form as shown in FIG. 6 for glucose. Derivatives of these sugars are included within this definition. Such derivatives include but are not limited to things such as gluconic acid, mucic acid, mannitol, sorbitol, etc. The derivatives generally do not exist in cyclic form.

FIG. 5

FIG. 6

Polysiloxanes

With regard to the polysiloxane component, polysiloxanes can be made using a three-step synthesis: chlorosilane synthesis, chlorosilane hydrolysis, followed by polymerization and polycondensation.

Chlorosilane Synthesis:

$$Si + RCl \rightarrow SiR'_4$$

where:

R=H, methyl or ethyl group, and

R'=Cl, H, methyl or ethyl.

This reaction is exothermic with a yield as high as 90%. A copper-based catalyst is usually used. The resulting various chloroalkylsilanes can be separated by fractionation distillation. If desired, silanes of other functionalities can be obtained via further reactions. For instance:

(Grignard Reaction)

$$MeSiCl_2 + C_6H_5MgBr \longrightarrow Me(C_6H_5)SiCl_2 + MgClBr$$
(Phenyl-)

(Vinyl Derivatives)

$$MeHSiCl_2 + acetylene \xrightarrow{Pt} H_2C=CHSiCH_3Cl_2$$

(Alkoxy Derivatives)

$$R_3SiCl + R'OH \xrightarrow{Alcoholysis} R_3SiOR' + HCl$$

where

R = alkyl, aryl, or other organofunctional group.

R'= methyl, ethyl or acetoxy

Chlorosilane Hydrolysis:

Dimethyldichlorosilanes undergo exothermic hydrolysis to yield disilanols which further condense to produce a variety of linear and/or cyclic oligomers:

$$x\, Me_2SiCl_2 \xrightarrow[-HCl]{+H_2O} y\, HO(Me_2SiO)_nH + z\, (Me_2SiO)_n$$
linear     cyclic where n=20–50; and m≧3

The linear and cyclic oligomers from the above hydrolysis need to be further polymerized or condensed to produce a silicone macromolecule of sufficient length.

Cyclic Polymerization

The $(R_2SiO)_n$ cyclic oligomers undergo ring opening and polymerization to form long linear chains. Polymer chain length are determined by the presence (concentration) of the chain endblocker.

$$z\, (Me_2SiO)_n + KOH \longrightarrow (Me_2SiO)y + KO(Me_2SiO)_mH$$

$$\sim\!Me_2SiOK + Me_3SiOSiMe_3 \longrightarrow \sim\!Me_2SiOSiMe_3 + Me_3SiOK$$

wherein m≧1 n≧3 y≧1

Copolymerization in the presence of a catalyst ($Me_4NOH$) can be carried out in the following scheme:

$$R_3SiOSi\, R_3 + x\, (R_2SiO)_4 \rightarrow R_3SiO(R_2SiO)_n\, Si\, R_3$$

where

R=alkyl, aryl, or other organofunctional group.

X≧1 n≧4

Linear Condensation

The linear silanol condenses to give long chain siloxanes.

$$\sim\!OSiR_2OH + \sim\!HOR_2SiO \longrightarrow \sim\!O-\underset{R}{\underset{|}{Si}}-O-\underset{R}{\underset{|}{Si}}-O\!\sim + H_2O$$

where

R=alkyl, aryl, or other organofunctional group

Attached to the silicon atom are organic side chains including alkyl, aliphatic hydrocarbons, phenyl or vinyl groups. By adjusting the —SiO— chain length, the side chain functionality and the crosslinking between molecular chains, silicones form an almost infinite number of hybrid polymers. In fact, the industry has created a plethora of novel silicones to provide various end use properties such as chemical compatibility, solubility, water repellency, lubrication, foam control, releasing aid, cooling, sealing, adhesion, coating and substantivity.

Organoreactive polysiloxanes and silanes are very useful in making hybrid polymers. The following are a few examples:

Copolymerization of Vinyl Silanes with an Organic Monomer:

$$x\, H_2C=CH-SiR_3 + y\, H_2C=CH-R' \longrightarrow$$

$$-(CH_2-\underset{SiR_3}{\underset{|}{CH}})_x-(CH_2-\underset{R'}{\underset{|}{CH}})_y-$$

where

R and R' are chlorine, amine, methoxy, acetoxy, hydroxyl, vinyl, or silicone hydride functionalities x≧1 y≧1

Addition of Silicone Functionality:

$$H-SiR_3 + R'OH \rightarrow R_3Si-OR' + H_2$$

where

R'=any organofunctional group

R=alkyl, aryl, or other organofunctional group

Modified Polysaccharides Containing Polysiloxane Moieties

Two primary methods are envisioned for incorporating polysiloxane moieties into the polysaccharide based materials.

In the first method the polysiloxane moieties are added via reaction between a functional group on the polysaccharide and a second functional group attached to the reagent containing the polysiloxane moiety. The polysaccharides may be derivatized or non-derivatized, cationic or non-cationic. The general reaction scheme is defined as follows:

$$Polysac-Z_1 + Z_2-R_1 \rightarrow Polysac-Z_3R_1$$

where:
- $Z_1$ = functional group attached to the polysaccharide molecule and may be present either from the natural state or from a derivatization process. Examples of $Z_1$ functional groups include but is not limited to —OH, —H$_2$, —COOH, —CH$_2$X (X=halogen), —CN, —CHO, —CS$_2$.
- $Z_2$ = Functional group attached to the $R_1$ moiety whose purpose is to react with a $Z_1$ functional group thereby attaching the $R_1$ moiety covalently to the polysaccharide.
- $R_1$ = Organofunctional unit containing a polysiloxane moiety, substituted or non-substituted, linear or branched.
- $Z_3$ = Bridging ligand formed as the result of reaction of $Z_1$ with $Z_2$.

Figure 7:
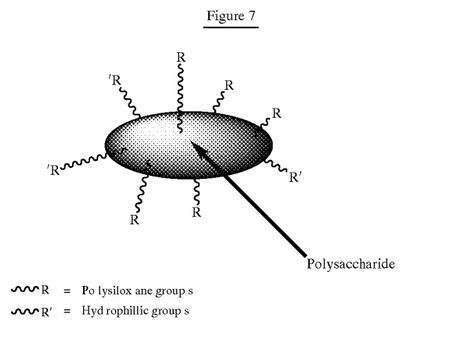

Such materials in general will have a macroscopic structure as shown in FIG. 7 where the polysiloxane moieties are attached in a pendant fashion to the polysaccharide. Where decreased water solubility becomes an issue a second moiety, containing a hydrophilic portion may be attached to the polysaccharide. For the same purpose, the polysiloxane moiety can contain hydrophilic functionalities (such as ethylene glycol and its oligomers and polymers) in its structure.

In theory the $Z_2$—$R_1$ reactant could be difunctional of the form $Z_2$—$R_2$—$Z_2$, however, in the case of most high molecular weight polysaccharides this crosslinking might lead to water insoluble products, suitable perhaps for coatings but not useful for wet end applications.

Figure 7

∿∿R  = Polysiloxane groups
∿∿R' = Hydrophillic groups

Synthesis of modified polysaccharides similar to those in FIG. 7 can be prepared via a number of methods. Attachment of the polysiloxane moiety can be achieved via the following paths:

1) Modified cationic polysaccharides prepared via a reaction as follows:

Starch - Modified Cationic where
n=1–4,
q≧1
R$_1$ has a polysiloxane backbone(with or without substitution). The following shows a specific example:

where
a≧1,
R is an alkyl or aliphatic hydrocarbon, linear or branched, saturated or unsaturated, with or without ethoxylation or other substitution, and
R$_2$ can be a polysiloxane (with or without substitution) or chosen from alkyl or aliphatic hydrocarbons that are linear or branched, saturated or unsaturated, substituted or unsubstituted, containing at least 4C.

2). Dialdehyde polysaccharides, particularly dialdehyde starches, cationic or non-cationic, modified with polysiloxanes via reaction of the aldehyde groups with alcohols, amines, sulfinic acids, sulfydydryl compounds and the like containing a polysiloxane moiety.

3). Direct reaction of a functionalized polysiloxane moiety with the hydroxyl or amine groups on the polysaccharide. The following is a specific example of attaching a polysiloxane moiety to chitosan:

where
c, d≧1,
R=—(CH$_2$)$_3$O(C$_2$H$_4$O)$_x$(C$_3$H$_6$O)$_y$H, and
x, y≧1, while x/y≧8 if hydrophilicity is desired, and x/y≧8 if hydrophobicity is desired.

4). Graft polymerization of siloxane units onto the polysaccharide backbone.

In the second method for incorporating polysiloxane moieties into the polysaccharide and monosaccharide based materials, two functional groups are attached to the polysiloxane containing reagent. The polysaccharides may be derivatized or non-derivatized, cationic or non-cationic. The general reaction scheme is defined as follows:

Polysac—Z$_1$+Z$_2$—R$_1$—Z$_2$→—Polysac—Z$_3$R$_1$—Polysac— where:
Z$_1$=functional group attached to the polysaccharide molecule and may be present either from the natural state or from a derivatization process. Examples of Z$_1$ functional groups include but is not limited to —OH, —NH$_2$, —COOH, —CH$_2$X (X=halogen), —CN, —CHO, —CS$_2$.
Z$_2$=Functional group attached to the R$_1$ moiety whose purpose is to react with a Z$_1$ functional group thereby attaching the R$_1$ moiety covalently to the polysaccharide.
Z$_3$=Bridging radical formed as the result of reaction of Z$_1$ with Z$_2$.
R$_1$ =polysiloxane, substituted or unsubstituted.

Figure 10:
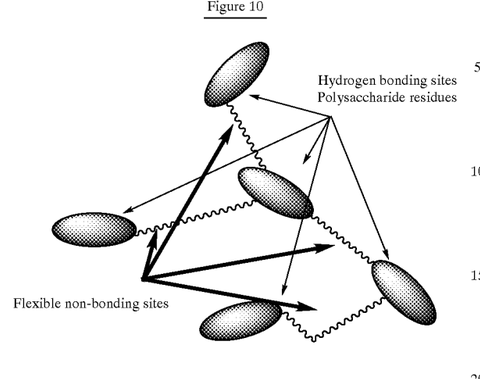

Such materials in general will have a macroscopic structure as shown in FIG. 10 where the polysiloxane moieties are attached in series to the polysaccharide or monosaccharide molecules. When employed in cellulosic structures these materials can be thought of as providing "spot welds" to the web consisting of regions of strong hydrogen bonding connected to other regions of high hydrogen bonding through flexible non-bonding links. The combination of such properties could provide for a cellulosic product having a very unusual combination of strength and softness.

Where decreased water solubility becomes an issue a second moiety, containing a hydrophilic portion may be attached to the polysaccharide and/or the polysiloxane. Examples of such materials would include ethylene glycol and its oligomers and polymers.

Figure 10

In theory the polysaccharides could be of high molecular weight, however, the crosslinking could lead to water insoluble products, suitable perhaps for coatings but not useful for wet end applications. For wet end applications lower molecular weight polysaccharides including the oligomers as well as the monosaccharides and sugar derivatives are better candidates for this approach. Synthesis of modified polysaccharides similar to those in FIG. 10 could be prepared via a number of methods as shown below:

1. Polysaccharides reacted with dicarboxylic functional polysiloxanes of the following structure:

where
Z=OH, halide, or other displaceable group,
Y=any polysiloxane group, with or without substitution, ethoxylation or propoxylation.

Specific structures include, but are not limited to, the following:

where
$e \geq 1$
$x, y \geq 0$,
R=any alkyl or aliphatic hydrocarbon, linear or branched, saturated or unsaturated, substituted or unsubstituted, with or without ethoxylation or propoxylation.

It will be appreciated that the foregoing examples, given for purposes of illustration, are not to be construed as limiting the scope of this invention, which is defined by the following claims and all equivalents thereto.

We claim:

1. A paper sheet comprising an added modified polysaccharide containing one or more covalently bonded polysiloxane moieties, said added modified polysaccharide having the following structure:

wherein
$n = 1-4$;
$q \geq 1$;
$R_1 =$ where
$a \geq 1$;
R=an alkyl or aliphatic hydrocarbon, linear or branched, saturated or unsaturated, with or without ethoxylation or other substitution; and
$R_2$=a polysiloxane (with or without substitution) or chosen from alkyl or aliphatic hydrocarbons that are linear or branched, saturated or unsaturated, substituted or unsubstituted, containing at least 4 carbon atoms,
R=any alkyl or aliphatic hydrocarbon, linear or branched, saturated or unsaturated, substituted or unsubstituted, with or without ethoxylation or propoxylation.

2. A paper sheet comprising an added modified polysaccharide containing one or more covalently bonded polysiloxane moieties, said added modified polysaccharide having the following structure:

wherein
$c, d \geq 1$,
$R = -(CH_2)_3O(C_2H_4O)_x(C_3H_6O)_yH$; and
$x, y \geq 1$.

3. A paper sheet comprising an added modified polysaccharide containing one or more covalently bonded polysiloxane moieties, said added modified polysaccharide having the following structure:

wherein $e \geq 1$;

$x, y \geq 0$; and

R=any alkyl or aliphatic hydrocarbon, linear or branched, saturated or unsaturated, substituted or unsubstituted, with or without ethoxylation or propoxylation.

4. A method of making a paper sheet comprising the steps of: (a) forming an aqueous suspension of papermaking fibers; (b) depositing the aqueous suspension of papermaking fibers onto a forming fabric to form a web; and (c) dewatering and drying the web to form a paper sheet, wherein a modified polysaccharide is added to the aqueous suspension, said modified polysaccharide having the following structure:

wherein n=1–4;

$q \geq 1$;

$R_1 =$ where $a \geq 1$;

R=an alkyl or aliphatic hydrocarbon, linear or branched, saturated or unsaturated, with or without ethoxylation or other substitution; and $R_2$=a polysiloxane (with or without substitution) or chosen from alkyl or aliphatic hydrocarbons that are linear or branched, saturated or unsaturated, substituted or unsubstituted.

5. A method of making a paper sheet comprising the steps of: (a) forming an aqueous suspension of papermaking fibers; (b) depositing the aqueous suspension of papermaking fibers onto a forming fabric to form a web; and (c) dewatering and drying the web to form a paper sheet, wherein a modified polysaccharide is added to the aqueous suspension, said modified polysaccharide having the following structure:

wherein $c, d \geq 1$, $R = -(CH_2)_3O(C_2H_4O)_x(C_3H_6O)_yH$; and $x, y \geq 1$.

6. A method of making a paper sheet comprising the steps of: (a) forming an aqueous suspension of papermaking fibers; (b) depositing the aqueous suspension of papermaking fibers onto a forming fabric to form a web: and (c) dewatering and drying the web to form a paper sheet, wherein a modified polysaccharide is added to the aqueous suspension, said modified polysaccharide having the following structure:

wherein $e \geq 1$;

$x, y \geq 0$; and

R=any alkyl or aliphatic hydrocarbon, linear or branched, saturated or unsaturated, substituted or unsubstituted, with or without ethoxylation or propoxylation.

* * * * *